May 4, 1971    D. S. CHISHOLM ET AL    3,577,494
METHOD FOR THE PREPARATION OF EXTRUDABLE
SYNTHETIC RESINOUS MATERIALS

Filed Sept. 5, 1969      2 Sheets-Sheet 1

INVENTORS.
Douglas S. Chisholm
BY James K. Rieke

AGENT

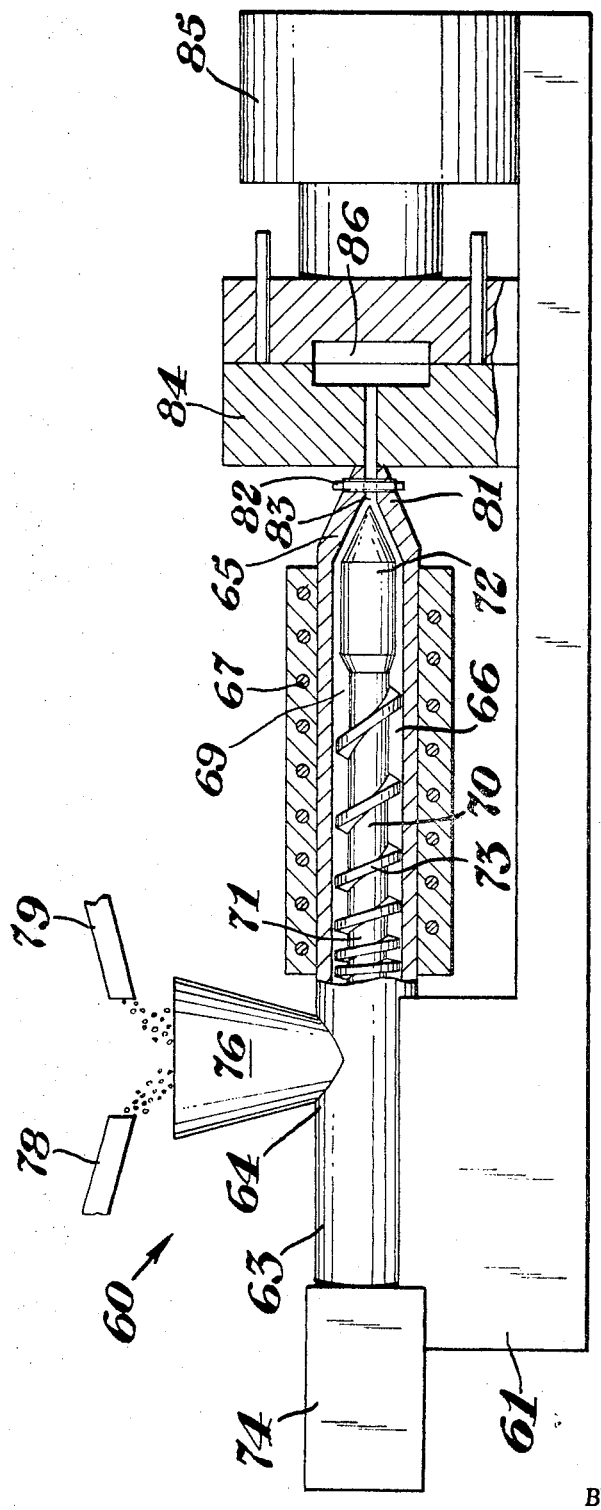

United States Patent Office 3,577,494
Patented May 4, 1971

3,577,494
METHOD FOR THE PREPARATION OF EXTRUD-
ABLE SYNTHETIC RESINOUS MATERIALS
Douglas S. Chisholm and James K. Rieke, Midland,
Mich., assignors to The Dow Chemical Company, Midland, Mich.
Continuation-in-part of application Ser. No. 796,937, Oct.
31, 1968, which is a continuation-in-part of application Ser. No. 677,440, Oct. 23, 1967. This application
Sept. 5, 1969, Ser. No. 857,298
Int. Cl. B28b 3/22
U.S. Cl. 264—143
10 Claims

ABSTRACT OF THE DISCLOSURE

Improved feed of granular synthetic resinous material in screw extruders is obtained and fiber breakage is significantly reduced when chopped glass fiber and extrudable resin are mixed in an extruder having an increasing working volume screw. The product has significantly improved impact strength.

Figure 1:
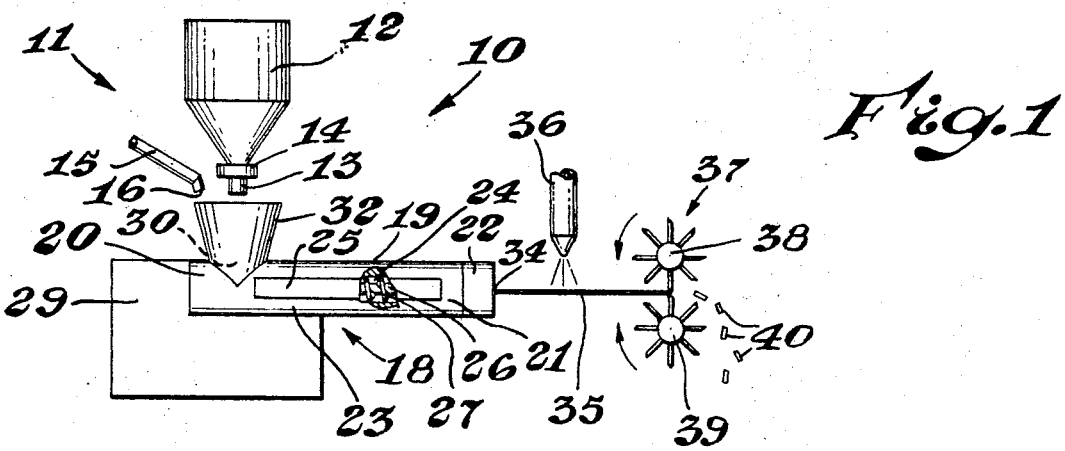

This application is a continuation-in-part of our copending application Ser. No. 796,937, filed Oct. 31, 1968, which in turn is a continuation-in-part of our prior application Ser. No. 677,440, filed Oct. 23, 1967, both now abandoned.

This invention relates to an improved method for the extrusion of synthetic resinous material and the incorportion of filamentary reinforcing into synthetic resinous materials.

In the extrusion of synthetic resinous materials, the output of an extruder is oftentimes limited by its heating capacity and the pressure developed within the extruder. Generally, the melting or heat plastifying capacity can be increased by increasing the temperature of the heaters, whether they be oil, electric or other heating means, and output increased by increasing the rate of rotation of the extruder screw. Oftentimes when attempting to maximize output from an extruder, the phenomenon of surging is encountered. For reasons not clearly understood, a screw extruder with apparently constant input or supply of granular plastic, temperature and screw speed has a varying output which, in most cases, results in a product having varying dimensions which generally is unacceptable. Frequently in the extrusion of synthetic resins, it is necessary in order to achieve the desired shape, surface finish or other characteristic of the product that relatively high internal pressures be developed. Oftentimes, output in weight of polymer per unit time is very much independent of the pressure drop. The higher the pressure drop, generally the lower the output. Frequently, to increase the output, increased screw speed is employed, oftentimes resulting in surging and/or other undesirable characteristics.

Filaments, fibers and the like have been used for the reinforcing of heat fabricated thermoplastic resinous materials (including extrudable thermosetting materials) such as polystyrene, polyvinyl chloride, nylon 66 (a condensation copolymer of hexamethylene diamine and adipic acid), ethyl cellulose, cellulose acetate, as well as many copolymeric compositions. Various methods have been employed to produce a suitable mixture of a filamentary reinforcing agent and a thermoplastic resinous material. Many of these efforts have been directed toward glass fibers or filaments, as desirable physical properties are achieved when from about 10 to 50 percent by weight of the thermoplastic resinous composition comprises filamentary glass. Glass filaments are somewhat brittle and they tend to fracture with mechanical working. Therefore, a number of methods have been developed for the incorporation of such glass fibers and filaments into a resinous mass. In general, known methods of preparing such mixtures suffer from the serious disadvantage of requiring expensive and time consuming operation, or, if such operations are not time consuming and expensive, they result in admixture of the filaments and the resinous material which is not generally satisfactory for most uses, as the filaments have been broken or shortened to a length where significant reinforcement is not obtained. Various attempts have been made to incorporate filamentary reinforcing such as glass filaments in thermoplastics by adding continuous roving to the extruder, chopped filaments in combination with pelletized or granular synthetic resins. Chopped filaments have also been added to heat plastified material within the extruder through a devolatilization port. Some of these techniques meet with varying success, depending upon the requirement of the end product. If, for example, the product is to be employed in the molding of small parts such as gears, desirable reinforcement is achieved employing relatively short length fibers and comminution of the reinforcing can be tolerated within the extruder. However, synthetic resinous moldings of larger and larger size are finding increased application in industry and it is desirable to achieve maximum physical properties such as impact strength employing a minimum quantity of material.

It would be desirable if there were available an improved method for the incorporation of filamentary reinforcing into synthetic extrudable resinous compositions.

It would also be desirable if there were an improved method for the mixing of synthetic resins which offered minimum filament degradation.

It would also be highly desirable if such a method could be practiced with a relatively minor modification of existing extrusion equipment.

These benefits and other advantages in accordance with the method of the present invention are achieved in a process for the extrusion of synthetic resinous materials and beneficially for admixing a filamentary reinforcing material with an extrudable synthetic resinous material wherein a synthetic resinous material and a filamentary reinforcing material are fed to a screw extrusion apparatus having a feed zone, a melting zone and a discharge zone, the extrudable material being mechanically admixed while in heat plastified form, the resultant heat plastified material being discharged in a desired form, the improvement which comprises feeding extrudable resinous material, and beneficially a filamentary reinforcing material, through the extruder by means of a rotating screw having a forwarding action, the screw being disposed mithin a generally cylindrical barrel, the screw having a feed end and a discharge end wherein the working volume of the screw increases in a direction from the feed end to the discharge end at least in the feed zone and the melting zone.

Also contemplated within the scope of the present invention is a method utilizing an apparatus for extrusion of an extrudable synthetic resinous material comprising in cooperative combination means to supply an extrudable synthetic resinous material, and beneficially, means to supply a filamentary reinforcing material, an extrusion apparatus having a feed port and an extrusion orifice, a feed zone, melting zone and discharge zone, the extruder having a generally hollow cylindrical barrel having a feed end and a discharge end, a screw disposed within the hollow cylindrical barrel, means to rotate the screw in operative association therewith, heating means associated with the extruder adapted to maintain the synthetic resinous material in a heat plastified form, the supply means in operative combination with the feed port of the extruder, the improvement which comprises the screw of the extruder having increasing working volume in a direction from the feed end of the extruder screw to the discharge end of the extruder screw and being without working volume reducing means from the feed port end of the screw to a location between the melting and mixing zones.

Further features and advantages of the present invention will become more apparent from the following specification taken in connection with the drawing wherein:

FIG. 1 schematically depicts an apparatus for practice of the method in accordance with the invention.

Figure 2:
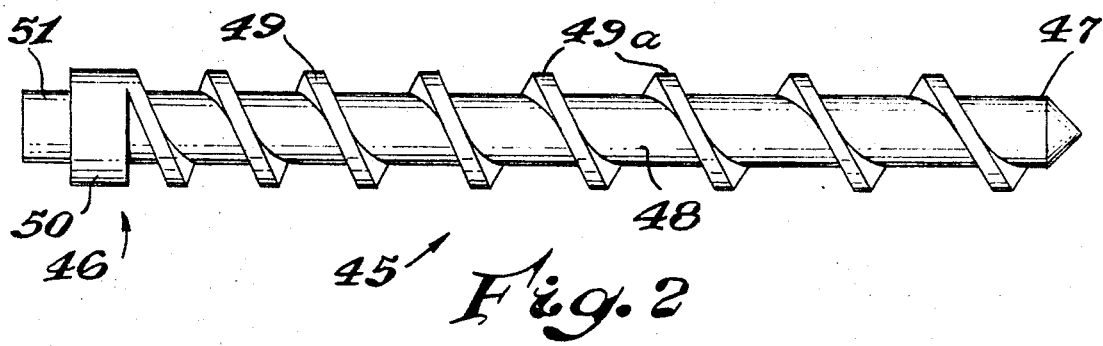
Figure 3:
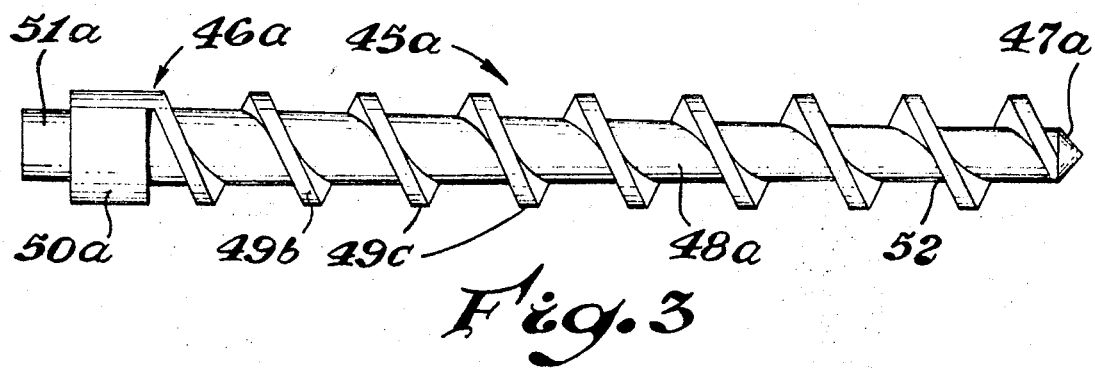
Figure 4:
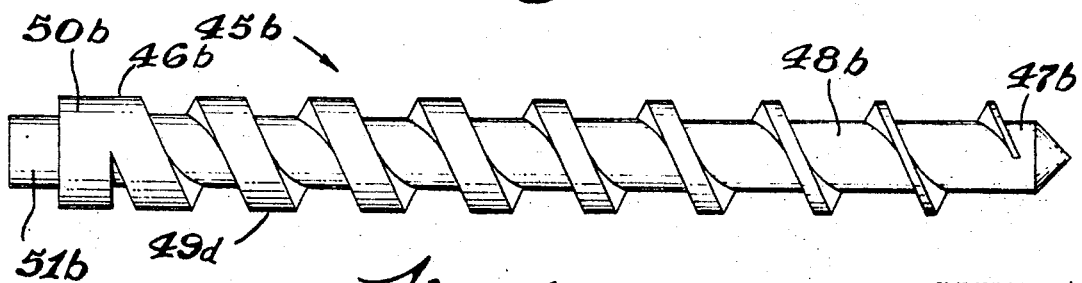

FIGS. 2, 3 and 4 schematically depict alternate embodiments of extruder screws useful with the apparatus of FIG. 1.

FIG. 5 schematically depicts an alternate apparatus for practice of the method in accordance with the invention.

In FIG. 1 there is schematically illustrated an extrusion apparatus used in accordance with the present invention generally designated by the reference numeral 10. The extrusion apparatus 10 comprises a supply means 11. The supply means 11 comprises a drive feed hopper 12 having a discharge 13 and a discharge control means or valve 14. Generally adjacent to the hopper 12 is a liquid supply 15 having a discharge 16 in closely spaced adjacent relationship to the discharge 13. An extrusion apparatus 18 has a heated barrel 19 having a feed end or zone 20, a discharge end 21, a die 22 operatively secured to the discharge end 21. The barrel 19 has a melting region or zone (wherein some mixing occurs) 23 adjacent the feed end 20. The barrel 19 has a heating means 25 and defines a generally internal cylindrical cavity 24 having disposed therein a forwarding and mixing extruder screw 26. The screw 26 has on the surface thereof flights 27 and has increasing working volume; i.e., the space defined between the screw and barrel per unit length of the screw increases toward the discharge end 21. A support and drive means 29 is operatively affixed to the barrel 19 and provides means to rotate the screw 26. The barrel 19 defines an inlet or feed port 30 adjacent the feed end or zone 20. An extruder hopper 32 is in operative communication with the feed port 30 and is adapted to receive materials from the discharge opening 13 of the hopper 12 and/or the discharge 16 of the liquid supply 15. The die 22 defines a discharge opening or extrusion orifice 34 from which issues a strand 35 composed of a synthetic resinous composition having filamentary reinforcing elements disposed therein. The strand 35 is passed to a cooling means 36 adapted to reduce the temperature of the strand below the thermoplastic temperature. The strand 35 is subsequently passed to a comminuting device 37 comprising first and second cooperating cutting elements 38 and 39 which sever the strand into a plurality of granules 40.

In FIG. 2 there is depicted an extruder screw generally designated by the reference numeral 45 particularly suited for use in the practice of the method of the present invention. The screw 45 has a feed end 46 and a discharge end 47, a body or root section 48 having a generally cylindrical configuration. A flight 49 is helically disposed on the root section and extends from the feed end 46 to the terminal or discharge end 47. The flight 49 has progressing increasing pitch as it progresses from the feed end 46 to the discharge end 47. The working volume of the screw at any point may be considered as the volume enclosed between one turn of the flight, the root section and an imaginary cylinder enclosing the screw and generally in contact with a terminal portion or land 49a of the flights remote from the root section 48. Thus, between successive turns of the flight, the working volume increases and no restriction is interposed which at any stage along the screw serves to decrease the working volume. Thus, the screw 45 can be said to be of constant root diameter and increasing pitch. Adjacent the feed end 46 of the screw 45 is a bearing portion 50 coaxial with the axis of the screw and adapted to be journaled within an extruder barrel. Remote from the flight 49a and the bearing portion 50 is a stub shaft 51 adapted to engage a means to rotate the screw in an appropriate direction to feed or forward material from the feed end to the discharge end.

In FIG. 3 there is depicted an alternate embodiment of a screw suitable for use in practice of the method of the present invention designated by the reference numeral 45a. The screw 45a has a feed end 46a, a discharge end 47a and a root portion 48a. A flight or helical land 49b is disposed about the root portion 48a. The flight 49b has terminal portions 49c disposed remote from the root portion 48a. The terminal portion 49c lies on a cylinder coaxial with the axis of the screw 45a. The flight 49b has a constant pitch from the first end 46a to the second end 47a and the root portion has a decreasing diameter from the feed end 46a to a location 52 adjacent the discharge end 47a and a constant diameter from the location 52 to the discharge end 47a. Thus, the working volume of the screw 45a increases between the feed end 46a and the location 52 and remains constant between the location 52 and the discharge end 47a. The screw 45a has a bearing portion 50a and a stub shaft or driving means 51a generally similar to the components 50 and 51 of the screw 45 of FIG. 2.

In FIG. 4 there is depicted an alternate embodiment of the screw 45b which differs from the screws 45 and 45a in having a constant diameter root section 48b and a tapering land 49d. The width of the land; that is, the land dimension in a direction parallel to the axis of the screw, decreases constantly toward the discharge end 47b providing a groove of constantly increasing volume. The embodiment of FIG. 4 is particularly advantageous because of the ease of fabrication.

In operation of the apparatus of FIG. 1 in the practice of the method of the present invention, a mixture of extrudable synthetic resinous thermoplastic material and filamentary reinforcing, as a beneficial option, is added to the hopper 32. The screw 26 is rotated within the barrel 19 causing the filamentary reinforcing-thermoplastic resinous material to advance toward the discharge end 21 thereof. The thermoplastic material within the barrel 19 is admixed with the resinous material and subsequently discharged from the extrusion orifice 34 as the strand 35. The strand 35 is cooled to about or below the thermoplastic temperature and is then severed into pellets for further processing. Advantageously, employing the principles of the present invention rather than forming a strand and subsequently pellets, the extruder may discharge directly into a mold.

In FIG. 5 there is shown schematically a partially cutaway view of an alternate screw extrusion apparatus for practicing the method in accordance with the invention generally designated by the reference numeral 60. The apparatus 60 is a screw injection molding machine comprising a base 61 supporting an extrusion barrel 63. The barrel 63 has a feed end 64 and a discharge end 65 and a melting zone 66. The barrel 63 has a heating means 67 disposed about the barrel and in communication with a heat source, not shown. The barrel 63 has an internal generally cylindrical cavity 69 containing an extrusion screw 70. The screw 70 has a feed end 71 and a mixing portion 72 remotely disposed from the feed end 71. A helically disposed flight 73 extends from the feed end 71 to the mixing end 72. The flight 73 increases in pitch in a direction from the feed end 71 to the mixing end 72 to provide a screw having increasing working volume. The screw 70 is rotatably and reciprocally mounted within the barrel by a screw operating means 74. A hopper 76 is in communication with the generally cylindrical cavity 69 and is adapted to receive resinous material from a supply source 78 and reinforcing material from a supply source 79. The barrel 63 remote from the feed end 71 terminates in a nose piece 81 having a valving member 82, a passage 83 which is shown in sealing engagement with a mold 84 supported on a mold positioning device 85. The mold 84 defines a material receiving cavity 86 of a desired shape.

In operation of the apparatus as depicted in FIG. 5, resinous material, such as a thermoplastic or extrudable thermoset material, and suitable reinforcing are provided to the hopper 76 by the supply sources 78 and 79. When the apparatus has reached a desired operating temperature, the screw is rotated until material discharges from the passage 83. The screw is simultaneously rotated and moved away from the passage 83 along the axis of the cavity 69 until a desired quantity of plastified material has accumulated in the space between the mixing means 72 and the valving member 82. The mold is placed in position in sealing engagement with the nose piece 81, the valving member 82 opened and the screw moved forward to discharge a desired quantity of material within the mold. When resinous material, with or without filamentary reinforcing material, is introduced into the hopper 76, the material is passed to the feed zone generally in the region of the termination of the lead line of the reference numeral 71 of FIG. 5. The resinous material and reinforcing material, if employed, are then forwarded by the screw toward the passage 83, passing through the melting zone wherein the resinous material is transformed from a solid into a viscoelastic fluid and further mixing of the heat plastified resin occurs. The apparatus is operated at such a rate that solid or unplastified resin does not reach a mixing zone generally coextensive with the mixing end 72 of the screw 70. The mixing end 72 has a diameter greater than the root diameter of the screw and subjects the mixture of heat plastified resinous material and filamentary reinforcing material, if employed, to shearing action as it passes over the mixing end 72. The use of the mixing portion 72 does not appear to promote significant filament breakage. It appears probable that in an extrusion process employing a screw-type extrusion apparatus the major breakage of the reinforcing filament, when included with the resinous material, would take place prior to melting or heat plastification of the resinous material.

In operation of the apparatus in the practice of the method of the present invention, a wide variety of synthetic resinous materials may be employed including all known extrudable thermoplastic resinous compositions which benefit from the addition of filamentary reinforcing. Commonly, synthetic resinous materials are employed such as nylon, polyethylene, polypropylene; resinous copolymers of ethylene and propylene; resinous copolymers of ethylene and acrylic acid; styrene polymers including polystyrene, acrylonitrile, butadiene; styrene polymers of styrene and polymethyl methacrylate; polyvinyl chloride-vinylidene chloride polymers such as polymers of vinylidene chloride and vinyl chloride. The most frequently employed and desirable filamentary reinforcing agent is glass filaments such as glass fibers in the form of roving or chopped strands. Generally, such reinforcements are incorporated in a proportion of about 10 to 50 weight percent, based on the weight of the resinous component. Advantageously, such materials can be fed to the feed port or the feed hopper of the extruder in dry condition.

The resinous material may be admixed by a suitable dry blending procedure with filamentary reinforcing and discharged from the feed hopper 12. Alternately, separate streams of granular or powdered resin and fiber reinforcing, such as metal fibers and/or chopped filamentary glass fibers, may be employed. Chopped filamentary glass fiber may be fed from the feed hopper 12 and a heat plastified resin provided from the liquid supply 15. The reinforcing may also be supplied in the form of continuous filament or tow and the filaments of the tow comminuted and admixed within the extruder.

By way of further illustration, granular polystyrene is dry blended with chopped glass fiber in a proportion of 30 weight percent glass and 70 weight percent polystyrene by tumbling in a hollow cylindrical dry blender. The resultant mixture is then fed to an extruder having a screw generally as depicted in FIG. 1 wherein the pitch of the flight of the screw approximately doubles in a uniform manner from the inlet end of the screw to the discharge end of the screw. The barrel of the extruder has two heating zones, one generally adjacent the feed port and one generally adjacent the die, which are each maintained at a temperature of 450° F. while the die is maintained at a temperature of about 475° F. A cone-tapered die is employed having an inlet one inch in diameter and a terminal extrusion orifice about ¼ inch in diameter. The resultant extruded strand is cooled and cut into pellets. The polymer is subsequently removed from the pellet to leave the glass fiber in an arrangement generally similar to the configuration it has in the polystyrene matrix. The length of the glass fiber appears to be generally similar to the lengths of the glass fibers fed to the extruder. A portion of the extrude is molded and evaluated for physical properties. The properties are set forth in the table and are shown in the column headed "Open Screw."

The foregoing procedure is repeated with the exception that the screw is replaced with a constant pitch, constant root diameter screw. Examination of the glass fiber obtained from the extruded pellet using the constant pitch or constant working volume screw indicates severe breakage of the glass fibers. Portions of the extrude are molded and tested for physical properties and the results are set forth in the table under the heading 'Straight Screw."

TABLE

| | Open screw | Straight screw |
|---|---|---|
| Izod, ft./lb. per inch of notch | 3.08 | 1.65 |
| Tensile modulus per square inch | 1,017,000 | 750,000 |
| Tensile strength per square inch | 3790 | 3500 |
| Elongation to break, percent | 0.43 | 0.53 |

From the table, it appears that the impact strength is almost doubled when a screw of increasing working volume or negative compression is employed.

Attempts to obtain maximum throughput of resin through the extruder with both straight and open screws at like barrel and die temperatures indicates that surging is substantially reduced when the open screw is employed.

When the apparatus of the foregoing illustration is employed for the extrusion of polyethylene wherein no heat is applied to the barrel, using the screw of increasing working volume or open screw, polyethylene is extruded from the die in the form of deformed granules which are tightly compacted and exhibit a relatively low tendency to adhere to each other. The amount of material is about equal to the amount of material extruded when the extruder barrel is heated to 450° F. When the straight screw is employed without heat applied to the barrel, no extrude is obtained. Disassembly of the extruder indicates that the polyethylene particles lodge in the flight of the straight screw and rotate therewith. The die is removed from the barrel and attached to a ram extrusion press and the pressure increased until the polyethylene is extruded at a generally like rate and in a generally like manner from the die. The pressure required is about 27,000 pounds per square inch.

In a similar manner, a 4.5 inch National Rubber Machinery extruder is fitted with an open screw generally as shown in FIG. 1 and fed with granular polystyrene. The extruder previously employed a straight screw with a decompression zone adjacent the volatile port. The volatile port is closed by a mild steel plate about ½ inch in thickness. On startup of the extruder, the mild steel plate is hydraulically deformed by the pressure developed in the extruder barrel. Deformation of the plate indicates that a pressure of about 2000 pounds per square inch is generated within the extruder. With the straight screw, the extruder does not generate sufficient pressure to force polymer from the volatile port when a screw of decreasing working volume having a decompression zone adjacent the vent or volatile port is employed.

Injection molded parts are obtained employing a screw injection apparatus generally similar to that depicted in FIG. 5 with the exception that the screw configurations employed are an increasing working volume screw of constant root diameter and having a pitch increasing from about 1.35 inches at the feed end to about 1.75 inches at the terminal portion of the screw. The injection apparatus is an Ankerwerk Model 17S having a screw diameter of about 1.75 inches. A mixture of polystyrene (80 weight percent) and ¼ inch long chopped glass fiber (20 weight percent) is employed as a feed stock. Injection molded samples are also prepared employing 70 weight percent polystyrene and 30 weight percent glass fiber as well as 80 weight percent styrene-acrylonitrile polymer with 20 weight percent glass fiber. The injection molded articles are subsequently sectioned and a portion heated to a temperature sufficient to remove the polymer from the glass fiber. Examination of the fiber mass under a microscope indicates relatively little breakage of the glass fibers. However, injection molded samples prepared in the same machine and under generally the same conditions using a conventional extrusion screw having decreasing working volume show a relatively high degree of breakage in the filaments.

Similar beneficial and advantageous results are achieved when a constant pitch diminishing root diameter increasing working volume screw is employed and when other synthetic resinous materials which respond to filamentary reinforcing are employed in practicing the method of the present invention.

Blends of extrudable resin or resin composition and particulate fillers are also employed with benefit. Particulate fillers such as calcium carbonate, titanium dioxide and the like with or without plasticizers, light and heat stabilizers, dyes, pigments and the like, dry blended (i.e., tumbled together at a temperature below the thermoplastic temperature of the resin, until a more or less uniform mixture is obtained) with a resin are utilized with benefit in the practice of the invention, as well as extrudable resinous compositions which are prepared by hot compounding on rolls, masticating mixers and the like.

Generally in the practice of the present invention, it is desirable to employ an extrusion screw having a lead or pitch to overall diameter of at least about 0.4. As the lead to diameter ratio decreases, usually, excessive working gives rise to fracture of reinforcing elements, and advantageously, a minimum lead to diameter ratio of 0.5 is utilized. Screws in accordance with FIG. 2 are found to be eminently satisfactory employing a minimum lead or pitch to diameter ratio of about 0.5 at the feed end and a lead to diameter ratio of about one at the discharge portion thereof. Although the lead to diameter ratio at the discharge portion may be as high as 2 or 2.5, it is not essential that the entire screw exhibit negative compression or increasing working volume, but only that portion of the screw which is adjacent the feed port and is frequently referred to as the melting zone or mixing and melting region. Regardless of whether the resinous material is added as a particulate solid or as a melt, the negative compression or increasing working volume is essential in the portion of the screw generally adjacent the feed port where initial mixing and melting or heat plastification takes place to minimize reinforcing fiber breakage. Once the heat plastified material is mixed in the feed and melting zones, it may then be subjected to relatively higher shear such as occurs in the apparatus depicted in FIG. 5 with minimal fiber breakage.

As is apparent from the foregoing specification, the present invention is susceptible of being embodied with various alternations and modifications which may differ particularly from those that have been described in the preceding specification and description.

What is claimed is:

1. A process for the extrusion of an extrudable material comprising synthetic resinous material wherein
   a synthetic resinous material and reinforcing filler are fed to a screw extrusion apparatus having a feed zone, a melting zone and a discharge zone,
   the resinous material and reinforcing filler being mechanically admixed while the resinous material is in heat plastified form,
   the resultant heat plastified resinous material and reinforcing filler being discharged from the extruder, the improvement which comprises,
   feeding the resinous material and reinforcing filler through the extruder by means of a rotating screw having a forwarding action, the screw being disposed within a generally cylindrical barrel, the screw having a feed and a discharge end wherein the working volume of the screw continuously increases in the region of the flight, in a direction from the feed end to the discharge end at least in the feed zone and the melting zone.

2. The process of claim 1 wherein the resinous material is provided to the extruder in the form of granules.

3. The process of claim 1 wherein the resinous material is provided to the extruder in the form of a thermoplastic melt.

4. The process of claim 1 wherein a filamentary reinforcing material and the resinous material are premixed prior to feeding to the extruder.

5. The process of claim 1 wherein the heat plastified material and reinforcing filler are discharged from the extruder in the form of a strand and subsequently comminuted into granules.

6. A process for admixing a filamentary reinforcing material with an extrudable synthetic resinous material wherein
   a synthetic resinous material and a filamentary reinforcing material are fed to a screw extrusion apparatus having a feed zone, a melting zone and a discharge zone,
   the filamentary material and the resinous material being admixed with each other while the resinous material is in heat plastified form,
   the resultant mixture of resinous material and filamentary reinforcing material being discharged from the extruder as a resinous matrix having filamentary reinforcing distributed therethrough, the improvement which comprises
   feeding the filamentary reinforcing and resinous material through the extruder by means of a rotating screw having a forwarding action, the screw being disposed within a generally cylindrical barrel, the screw having a feed end and a discharge end wherein the working volume of the screw continuously increases, in the region of the flight, in a direction from the feed end to the discharge end at least in the feed zone and the melting zone.

7. The process of claim 6 wherein the resinous material is provided to the extruder in the form of granules.

8. The process of claim 6 wherein the resinous material is provided to the extruder in the form of a thermoplastic melt.

9. The process of claim 6 wherein the filamentary reinforcing material and resinous material are pre-mixed prior to feeding to the extruder.

10. The process of claim 6 wherein the mixture is discharged from the extruder in the form of a strand and is subsequently comminuted into granules.

References Cited

UNITED STATES PATENTS

| | | | |
|---|---|---|---|
| 3,009,202 | 11/1961 | Maccaferri | 18—12SE |
| 3,164,563 | 1/1965 | Maxwell | 260—37 |
| 3,352,952 | 11/1967 | Marr | 264—176 |
| 3,453,356 | 7/1969 | Kent, Jr., et al. | 264—176 |

ROBERT F. WHITE, Primary Examiner

G. AUVILLE, Assistant Examiner

U.S. Cl. X.R.

18—12; 264—176; 349